UNITED STATES PATENT OFFICE.

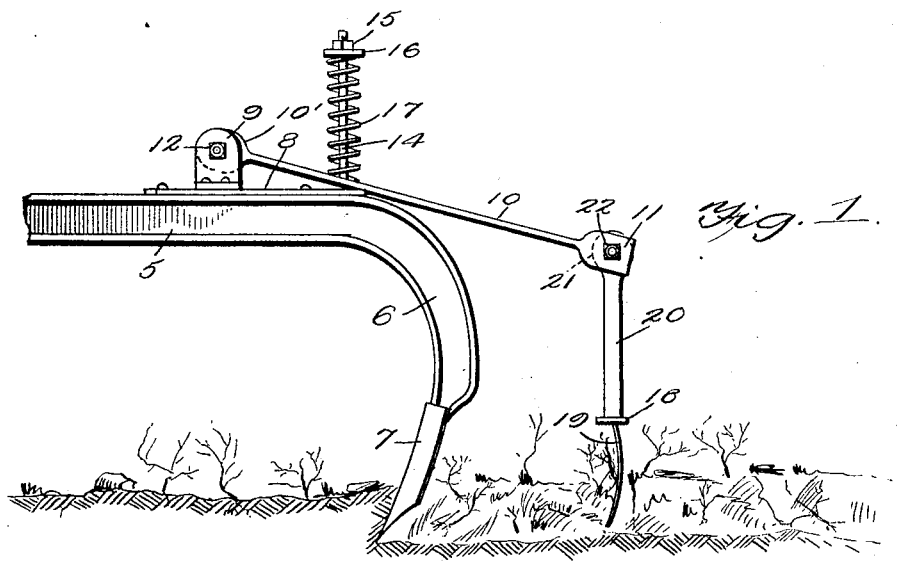
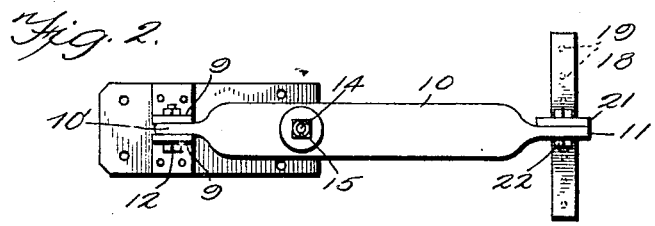
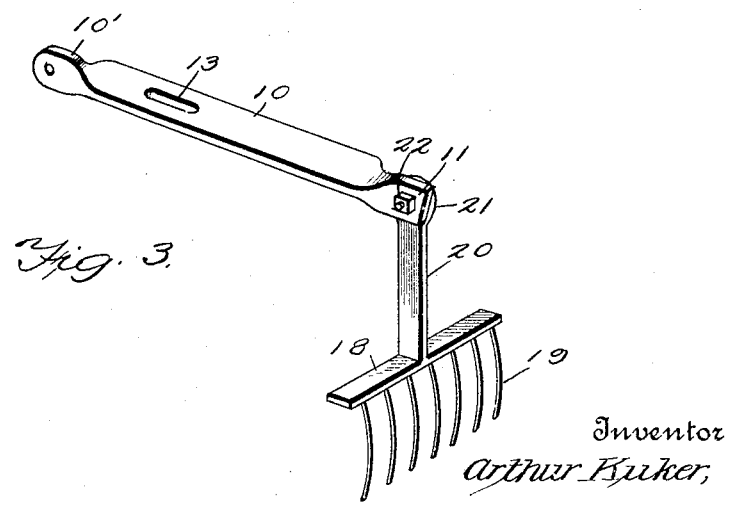

ARTHUR KUKER, OF SUMNER, IOWA.

WEEDER OR RAKE ATTACHMENT.

1,333,854.  Specification of Letters Patent.  Patented Mar. 16, 1920.

Application filed January 20, 1920. Serial No. 352,697.

*To all whom it may concern:*

Be it known that I, ARTHUR KUKER, a citizen of the United States, residing at Sumner, in the county of Bremer and State of Iowa, have invented certain new and useful Improvements in Weeder or Rake Attachments, of which the following is a specification.

My invention relates to a rake or weeder attachment, for a surface cultivator or the like.

An important object of the invention is to provide a device of the above mentioned character, which is extremely simple in construction, strong, durable, and self-adjusting, so that the rake element may move upwardly upon encountering a stone, or other obstruction.

A further object of the invention is to provide a device of the above mentioned character, which may be readily applied to the beam of the ordinary cultivator, without altering the construction thereof.

Other objects and advantages of the invention will be apparent during the course of the following description.

In the accompanying drawings forming a part of this specification, and in which like numerals are employed to designate like parts throughout the same, Figure 1 is a side elevation of a device embodying my invention, Fig. 2 is a plan view of the same, and, Fig. 3 is a perspective view of the swinging arm and rake element, embodied in the device.

In the drawings, wherein for the purpose of illustration is shown a preferred embodiment of my invention, the numeral 5 designates the beam of a cultivator, such as a surface cultivator. The beam may be used alone or in gangs of other beams. The beam 5 has its rear end extending downwardly in the form of a standard 6, carrying a plow share 7. Any suitable number of standards may be secured to the beam 5.

My rake or weeder attachment embodies a preferably flat plate 8, arranged upon the beam 5, near its rear end, and bolted or otherwise rigidly secured thereto.

The numeral 9 designates a pair of apertured ears, bolted to the plate 8, in spaced relation, and extending longitudinally of the same.

The numeral 10 designates an arm or bar, which is preferably rigid, and provided at its ends with apertured ears 10' and 11, which are vertically arranged, as shown. The forward ear 10' is arranged between the apertured ears 9, and pivotally connected therewith by means of a bolt 12 or the like.

The arm 10 is provided near and spaced from its forward end with a longitudinal opening 13, slidably receiving a vertical rod 14, which is rigidly secured to the rear end of the plate 8, as shown. The opening or slot 13 permits of the vertical swinging movement of the arm 10, about the rod 14, but prevents perceptible lateral movements of the arm. The upper end of the rod 14 is screw-threaded, for receiving an adjusting nut 15, engaging a washer 16, in turn engaging a compressible coil spring 17. The spring 17 surrounds the rod 14 and engages the arm 10, to force it downwardly. The tension of the spring 17 may be regulated by turning the nut 15.

The numeral 18 designates a rake element, having teeth 19. This rake element is carried by an arm or standard 20, provided at its upper end with an apertured head 21. The head 21 is clamped to the ear 11 by a bolt 22 or the like. It is obvious that the arm 10 may swing vertically, so that the rake element may move upwardly when encountering a stone or like obstruction. The arm or standard 20 may be angularly adjusted with relation to the arm 10.

It is to be understood that the form of my invention herewith shown and described is to be taken as a preferred embodiment of the same, and that various changes in the shape, size, and arrangement of parts may be resorted to without departing from the spirit of my invention, or the scope of the subjoined claims.

Having thus described my invention, I claim:—

1. The combination with a cultivator beam or the like, of a plate arranged upon the top of the rear portion thereof and carrying upstanding apertured ears, an arm having its forward end pivoted to the apertured ear and extending rearwardly beyond the beam for a substantial distance and provided with an elongated opening, a standard secured to the rear end of the arm, a rake element carried by the standard, a vertical rod rigidly secured to the plate and projecting upwardly through the elongated opening, and a compressible coil spring surrounding the rod and engaging the arm to oppose its upward movement.

2. The combination with a cultivator beam or the like, of a flat plate arranged upon the top of the rear portion thereof and carrying upstanding apertured ears, an arm having its forward end arranged between the apertured ears and pivoted thereto to swing in a vertical plane and having an elongated opening formed therein, said arm extending rearwardly beyond the beam, a standard angularly adjustably connected with the rear end of the arm, a rake element carried by the standard, a vertical rod rigidly secured to the plate and projecting upwardly through the elongated opening, and having its upper end screw-threaded, a compressible coil spring surrounding the rod above said arm, and an adjusting nut engaging the screw-threaded end of the rod to regulate the tension of the spring.

In testimony whereof I affix my signature in presence of two witnesses.

ARTHUR KUKER.

Witnesses:
W. A. RIBBECK,
J. P. MURPHY.